US010392036B2

United States Patent
Aoyama et al.

(10) Patent No.: US 10,392,036 B2
(45) Date of Patent: Aug. 27, 2019

(54) TRAIN CONTROL SYSTEM, BASE STATION CONTROL DEVICE, AND GROUND WIRELESS BASE STATION SYSTEM

(71) Applicant: MITSUBISHI ELECTRIC CORPORATION, Chiyoda-ku, Tokyo (JP)

(72) Inventors: Tetsuya Aoyama, Tokyo (JP); Seiya Nagashima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 97 days.

(21) Appl. No.: 15/542,205

(22) PCT Filed: Mar. 5, 2015

(86) PCT No.: PCT/JP2015/056550
§ 371 (c)(1),
(2) Date: Jul. 7, 2017

(87) PCT Pub. No.: WO2016/139807
PCT Pub. Date: Sep. 9, 2016

(65) Prior Publication Data
US 2018/0001916 A1    Jan. 4, 2018

(51) Int. Cl.
*G05D 1/00* (2006.01)
*G05F 7/00* (2006.01)
(Continued)

(52) U.S. Cl.
CPC ............ *B61L 15/0027* (2013.01); *B61L 3/12* (2013.01); *B61L 15/0054* (2013.01);
(Continued)

(58) Field of Classification Search
CPC combination set(s) only.
See application file for complete search history.

(56) References Cited

U.S. PATENT DOCUMENTS 5,914,948 A * 6/1999 Frank ................... H04B 7/2646
370/337
5,940,380 A * 8/1999 Poon ................. H04W 36/0094
370/330

(Continued)

FOREIGN PATENT DOCUMENTS

JP    2000-165312 A    6/2000
JP    2000-168556 A    6/2000
(Continued)

OTHER PUBLICATIONS

International Search Report (PCT/ISA/210) dated May 26, 2015, by the Japanese Patent Office as the International Searching Authority for International Application No. PCT/JP2015/056550.
(Continued)

*Primary Examiner* — Khoi H Tran
*Assistant Examiner* — Jorge O Peche
(74) *Attorney, Agent, or Firm* — Buchanan Ingersoll & Rooney PC

(57) ABSTRACT

A train control system enabling a train to smoothly travel while performing handover. The system includes an on-vehicle wireless station mounted on a train following a preceding train and connected to an on-vehicle control device of the train, ground wireless base stations capable of wirelessly communicating with the on-vehicle wireless station, and a base station control device to control the base stations. The ground wireless base station is located between the ground wireless base station with which the on-vehicle wireless station is communicating and the ground wireless base station forming a communication area including a travelling permission point determined by a position of the train. The base station control device reserves radio resources of the ground wireless base stations while communicating with the ground wireless base station.

9 Claims, 4 Drawing Sheets

(51) Int. Cl.
*B61L 15/00* (2006.01)
*B61L 3/12* (2006.01)
*H04W 36/18* (2009.01)
*H04W 36/32* (2009.01)
*H04W 84/00* (2009.01)
*B61L 27/00* (2006.01)
*H04W 36/00* (2009.01)
*H04W 4/42* (2018.01)

(52) U.S. Cl.
CPC ... *B61L 27/0005* (2013.01); *H04W 36/00835* (2018.08); *H04W 36/18* (2013.01); *H04W 36/32* (2013.01); *H04W 84/005* (2013.01); *H04W 4/42* (2018.02); *Y02D 70/00* (2018.01)

(56) References Cited

U.S. PATENT DOCUMENTS

| | | | | |
|---|---|---|---|---|
| 8,264,539 | B2* | 9/2012 | Takada | H04N 5/76 348/143 |
| 10,148,760 | B2* | 12/2018 | Barragan | H04L 67/12 |
| 2002/0146979 | A1* | 10/2002 | Regulinski | H04B 7/18513 455/13.1 |
| 2002/0151277 | A1* | 10/2002 | Fujiwara | H04W 88/02 455/67.11 |
| 2004/0058678 | A1* | 3/2004 | deTorbal | H04W 36/32 455/437 |
| 2004/0111722 | A1* | 6/2004 | Horst | B61L 3/127 717/168 |
| 2004/0256455 | A1* | 12/2004 | Fukushima | G06Q 20/105 235/382 |
| 2005/0208924 | A1* | 9/2005 | Ohaku | B61L 27/0005 455/345 |
| 2006/0045054 | A1* | 3/2006 | Utsumi | H04B 10/25754 370/338 |
| 2006/0088112 | A1* | 4/2006 | Das | H04L 27/261 375/260 |
| 2007/0004363 | A1* | 1/2007 | Kusaka | H01Q 1/007 455/269 |
| 2007/0066273 | A1* | 3/2007 | Laroia | H04W 52/0235 455/343.2 |
| 2008/0195269 | A1* | 8/2008 | Lacy | B61L 3/006 701/24 |
| 2008/0312775 | A1* | 12/2008 | Kumar | B61L 3/006 701/2 |
| 2009/0186325 | A1* | 7/2009 | Kumar | B61C 17/12 434/219 |
| 2010/0308966 | A1* | 12/2010 | Oki | G06Q 10/02 340/10.1 |
| 2010/0323699 | A1* | 12/2010 | Hashimoto | H04W 24/02 455/436 |
| 2011/0312369 | A1* | 12/2011 | Furuya | H04W 36/08 455/525 |
| 2012/0287783 | A1* | 11/2012 | Kuhn | H04W 16/08 370/230 |
| 2012/0289233 | A1* | 11/2012 | Medbo | G01S 11/10 455/436 |
| 2012/0322449 | A1* | 12/2012 | Shimizu | H04W 36/24 455/436 |
| 2013/0146719 | A1* | 6/2013 | Yoon | B61L 27/0005 246/122 R |
| 2013/0171590 | A1* | 7/2013 | Kumar | B61L 3/006 434/62 |
| 2013/0178213 | A1* | 7/2013 | Li | H04W 36/0088 455/436 |
| 2015/0012309 | A1* | 1/2015 | Buchheim | G07B 15/063 705/5 |
| 2015/0038143 | A1* | 2/2015 | Kilpatrick, II | H04W 64/00 455/436 |
| 2015/0038147 | A1* | 2/2015 | Jeong | B61L 15/0027 455/437 |
| 2015/0065145 | A1* | 3/2015 | Huang | H04W 52/40 455/438 |
| 2015/0253146 | A1* | 9/2015 | Annapureddy | G01C 21/36 701/490 |
| 2015/0358882 | A1* | 12/2015 | Liu | H04W 36/18 370/331 |
| 2016/0046307 | A1* | 2/2016 | Miyajima | B60L 15/40 701/19 |
| 2016/0119866 | A1* | 4/2016 | Miyagi | H04W 52/0206 370/311 |
| 2016/0217690 | A1* | 7/2016 | Yamasaki | H04W 4/046 |
| 2016/0362122 | A1* | 12/2016 | Barragan | H04L 67/12 |
| 2017/0181046 | A1* | 6/2017 | Hunukumbure | H04W 36/023 |
| 2017/0289834 | A1* | 10/2017 | Axmon | H01Q 25/02 |
| 2018/0026736 | A1* | 1/2018 | Mitani | H04W 4/04 370/337 |
| 2018/0035348 | A1* | 2/2018 | Axmon | H04W 24/10 |
| 2018/0054343 | A1* | 2/2018 | Suzuki | H04J 11/00 |
| 2018/0098260 | A1* | 4/2018 | Wang | H04W 36/0005 |
| 2018/0273061 | A1* | 9/2018 | Horst | B61L 3/008 |
| 2018/0302835 | A1* | 10/2018 | Yamasaki | H04W 36/32 |
| 2018/0334179 | A1* | 11/2018 | Aoyama | B61L 27/0038 |
| 2019/0077432 | A1* | 3/2019 | Itagaki | B61L 27/0005 |

FOREIGN PATENT DOCUMENTS

| | | | |
|---|---|---|---|
| JP | 2002-165253 | A | 6/2002 |
| JP | 2003-231467 | A | 8/2003 |
| JP | 2007-082075 | A | 3/2007 |
| JP | 2011-029930 | A | 2/2011 |
| JP | 2013-223063 | A | 10/2013 |

OTHER PUBLICATIONS

Written Opinion (PCT/ISA/237) dated May 26, 2015, by the Japanese Patent Office as the International Searching Authority for International Application No. PCT/JP2015/056550.

* cited by examiner

TRAIN CONTROL SYSTEM, BASE STATION CONTROL DEVICE, AND GROUND WIRELESS BASE STATION SYSTEM

FIELD

The present invention relates to a train control system in which a plurality of ground wireless base stations are installed along a railroad and continuous wireless communication can be made by handover, and a base station control device, a ground wireless base station, and an on-vehicle wireless station.

BACKGROUND

A train control system using wireless communication, which is referred to as "CBTC (Communication Based Train Control)", has been introduced in recent years. In the train control system using the wireless communication, various information such as position information on a travelling train and control information on the train is transmitted and received by wireless communication between a ground wireless base station installed along a railroad and an on-vehicle wireless station installed in the train. Since it is difficult for this train control system to cover the entire area along the railroad by a single ground wireless base station, plural ground wireless base stations are required in the entire area. In 2.4 GHz band wireless communication that is mainly used in CBTC, for example, the ground wireless base stations are installed at an interval of several hundreds of meters, and the on-vehicle wireless station is required to perform handover that switches a ground wireless base station that is to communicate with the on-vehicle wireless station as the train moves.

For example, Patent Literature 1 discloses a mobile communication system. For this mobile communication system, to achieve an object of "accurately determining a base station covering an area including a destination of a mobile station moving on a predetermined route", "a ground control device 101 compares a travelling permission position 104 given to a train 103 with a handover point 105 and, when the travelling permission position 104 exceeds the handover point 105, the ground control device 101 determines that the train 103 travels ahead of the handover point 105 and reserves a wireless channel of a ground-side wireless control device 102 located ahead of the handover point 105".

CITATION LIST

Patent Literature

Patent Literature 1: Japanese Patent Application Laid-open No. 2000-168556

SUMMARY

Technical Problem

However, the conventional technique described above is premised on the assumption that a communication area of a ground wireless base station with which an on-vehicle wireless station mounted on a train is communicating is adjacent to a communication area including a travelling permission position determined by a relation between this train and its preceding train. In a case where the ground wireless base stations are installed at an interval of several hundreds of meters as in CBTC, a communication area formed by some ground wireless base station is usually located between the communication area of the ground wireless base station which is performing the communication and the communication area including the travelling permission position. If the communication area of the ground wireless base station with which the on-vehicle wireless station mounted on the train is communicating is adjacent to the communication area including the travel permission position determined by the relation between this train and the preceding train, the train may be frequently stopped at the travel permission position determined by the relation between the train and the preceding train, and therefore, it is difficult to operate the train smoothly. Accordingly, it is difficult to apply the conventional technique described above as it is where the ground wireless base stations are installed at an interval of several hundreds of meters as in CBTC.

The present invention has been achieved in view of the above problems, and an object of the present invention is to provide a train control system that enables a train to travel smoothly while performing handover, even in a case where a communication area formed by some ground wireless base station is located between a communication area of a ground wireless base station with which an on-vehicle wireless station is communicating and a communication area including a travelling permission position determined by a relation with a preceding train.

Solution to Problem

To solve the above problems and achieve the object, the present invention provides a train control system comprising: an on-vehicle wireless station mounted on a following train following a preceding train and connected to an on-vehicle control device of the following train; a plurality of ground wireless base stations capable of wirelessly communicating with the on-vehicle wireless station; and a base station control device to control the ground wireless base stations, wherein one or a plurality of third ground wireless base stations are located between a first ground wireless base station that is the ground wireless base station with which the on-vehicle wireless station is communicating and a second ground wireless base station forming a communication area including a travelling permission point determined by a position of the preceding train, and the base station control device reserves radio resources of all of the second ground wireless base station and the third ground wireless base station while communicating with the first ground wireless base station.

Advantageous Effects of Invention

According to the present invention, it is possible to obtain a train control system that enables a train to travel smoothly while performing handover, even in a case where a communication area formed by some ground wireless base station is located between a communication area of a ground wireless base station with which an on-vehicle wireless station is communicating and a communication area including a travelling permission position determined by a relation with a preceding train.

DESCRIPTION OF EMBODIMENTS

Exemplary embodiments of a train control system, a base station control device, a ground wireless base station, and an on-vehicle wireless station according to the present invention will be described in detail below based on the drawings. The present invention is not limited by the embodiments.

First Embodiment

Figure 1:
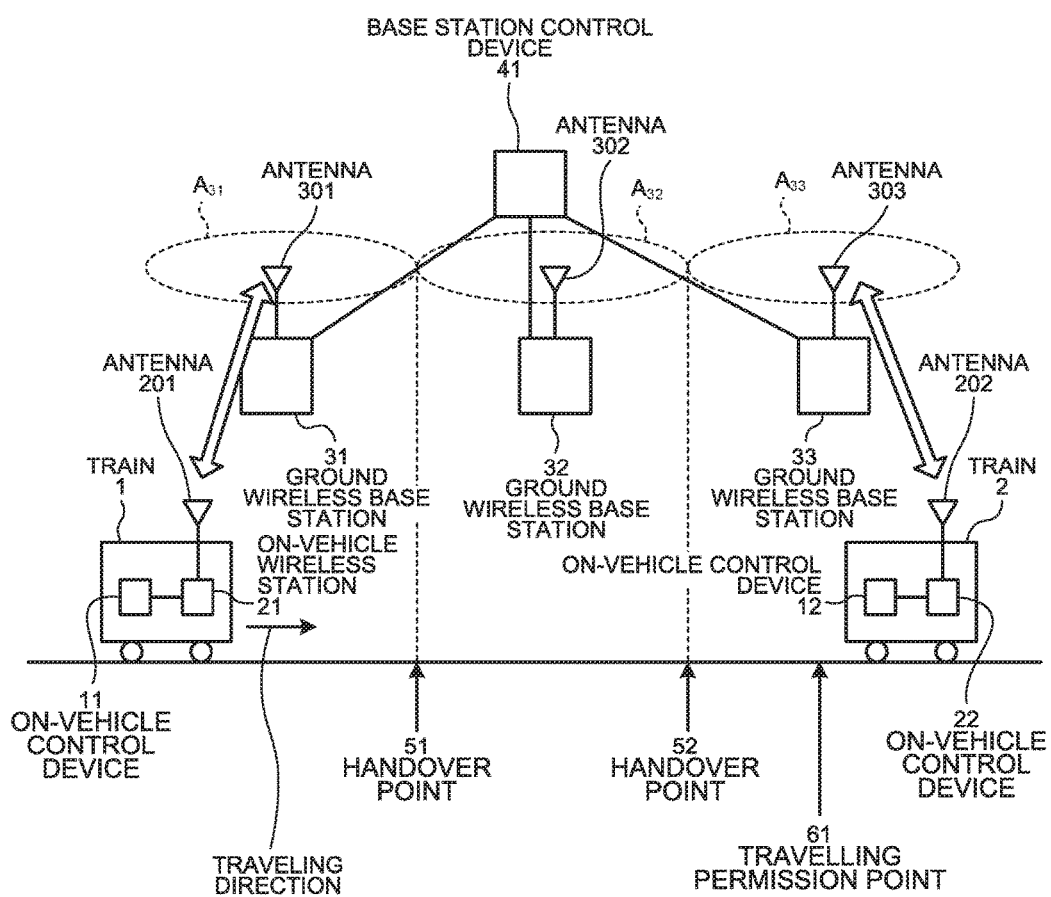
FIG. 1 is a diagram illustrating a configuration of a train control system according to a first embodiment.

FIG. 1 is a diagram illustrating a configuration of a train control system according to a first embodiment of the present invention. The train control system illustrated in FIG. 1 includes an on-vehicle wireless station 21, a plurality of ground wireless base stations 31, 32, and 33, and a base station control device 41. The on-vehicle wireless station 21 is mounted on a train 1 following a train 2 and is connected to an on-vehicle control device 11 that controls travelling of the train 1. The ground wireless base stations 31, 32, and 33 are capable of wirelessly communicating with the on-vehicle wireless station 21. The base station control device 41 controls the ground wireless base stations 31, 32, and 33. The on-vehicle wireless station 21 includes an antenna 201, and the ground wireless base stations 31, 32, and 33 include antennas 301, 302, and 303, respectively.

The ground wireless base stations 31, 32, and 33 installed on the ground respectively form wireless communication areas $A_{31}$, $A_{32}$, and $A_{33}$, respectively, that are continuous along a railroad on which the train 1 travels, and transmit control information used for travel of the train 1 to the on-vehicle wireless station 21 and periodically receive position information on the train 1 from the on-vehicle wireless station 21. The control information includes control information on the train 1 transmitted from the ground wireless base stations 31, 32, and 33 to the on-vehicle wireless station 21. The train 1 travels in accordance with the control information.

In FIG. 1, an area in which the ground wireless base station 31 can perform communication includes not only the wireless communication area $A_{31}$ but also a part of the wireless communication area $A_{32}$, an area in which the ground wireless base station 32 can perform communication includes not only the wireless communication area $A_{32}$ but also a part of each of the wireless communication areas $A_{31}$ and $A_{33}$, and an area in which the ground wireless base station 33 can perform communication includes not only the wireless communication area $A_{33}$ but also a part of the wireless communication area $A_{32}$. That is, an area in which the ground wireless base station can perform communication overlaps an area in which the adjacent ground wireless base station can perform communication.

The base station control device 41 performs wired communication with the ground wireless base stations 31, 32, and 33 and controls the ground wireless base stations 31, 32, and 33. More specifically, the base station control device 41 transmits control information on a train to the ground wireless base stations 31, 32, and 33, and controls the ground wireless base stations 31, 32, and 33 at a time of handover at which the ground wireless base station to be connected to the on-vehicle wireless station 21 is switched as the train 1 moves on the railroad. The on-vehicle wireless station 21 performs handover as the train 1 moves on the railroad, such that the on-vehicle wireless station 21 switches a wireless-communication connection target from the ground wireless base station 31 having the antenna 301 to the ground wireless base station 32 having the antenna 302, and then from the ground wireless base station 32 having the antenna 302 to the ground wireless base station 33 having the antenna 303. This achieves a configuration that enables smooth continuous wireless communication with the ground even when the train 1 is moving. In the first embodiment, handover is achieved by switching the wireless-communication connection target to the ground wireless base station 32 that is a next ground wireless base station in a traveling direction of the train 1 when it is detected that the train 1 has passed through a handover point 51 between the wireless communication area $A_{31}$ and the wireless communication area $A_{32}$, and then switching the wireless-communication connection target to the ground wireless base station 33 that is a next ground wireless base station in the traveling direction of the train 1 when it is detected that the train 1 has passed through a handover point 52 between the wireless communication area $A_{32}$ and the wireless communication area $A_{33}$. In the first embodiment, the ground wireless base station that becomes the wireless-communication connection target by the occurrence of handover is referred to as "handover destination".

The handover points 51 and 52 are each represented by a distance in kilometers in each railroad section and is recorded in the base station control device 41. In the first embodiment, the handover point 51 is located between the ground wireless base station 31 and the ground wireless base station 32, and the handover point 52 is located between the ground wireless base station 32 and the ground wireless base station 33. In more detail, each of the handover points 51 and 52 is set at an intermediate point between a ground wireless base station that is a pre-handover connection target and a ground wireless base station that is a handover destination. Each of the ground wireless base stations 31, 32, and 33 manages a radio resource available within its own area, and allocates the radio resource to an on-vehicle wireless station that performs communication within its own area in accordance with an instruction from the base station control device 41. Each of the ground wireless base stations 31, 32, and 33 and the on-vehicle wireless station communicate with each other by using the radio resource allocated by the corresponding one of the ground wireless base stations 31, 32, 33. In a case where the radio resource from the ground wireless base station 31, 32, or 33 is not allocated, the on-vehicle wireless station cannot communicate with the ground wireless base station 31, 32, or 33. Examples of the radio resource include a time slot and a frequency slot.

The train 2 is a preceding train located at the closest position to the train 1. The train 2 includes an on-vehicle wireless station 22 mounted on the train 2 and connected to an on-vehicle control device 12 and an antenna 202. The antenna 202 performs wireless communication with the ground wireless base stations 31, 32, and 33 via the antennas 301, 302, and 303, respectively. The train 2 is the preceding train located at the closest position to the train 1, and in other words, the train 1 is a following train located at the closest position to the train 2.

A travelling permission point 61 illustrated in FIG. 1 is set at a position that is away from the rear (tail end) of the last car of the train 2 by a distance that should be maintained between the train 1 and the train 2. The train 1 can travel to the travelling permission point 61 in terms of a relation with the preceding train, but cannot travel in a communication area where no radio resource is allocated. For example, in a case where a radio resource is not yet allocated to the train 1 in a communication area of the ground wireless base station 33, the train 1 cannot enter the communication area of the ground wireless base station 33, and hence is forced to be stopped at the handover point 52.

When the radio resource of the ground wireless base station is not yet allocated to the train on the railroad, as described above, it is likely that a reservation for allocation of radio resource is not completed before the train enters the communication area. The train that is not yet allocated the radio resource cannot communicate with the ground wireless base station forming the communication area, so that a smooth operation of the train is obstructed. Therefore, in the train control system according to the first embodiment, the reservation for allocation of radio resource is made at a position before a handover point. By making the reservation for allocation of radio resource as early as possible in the traveling direction of the train, the possibility that the radio resource is not yet allocated can be made as low as possible. Meanwhile, the reservation is not made for an area ahead of the area including the travel permission point 61.

Figure 2:
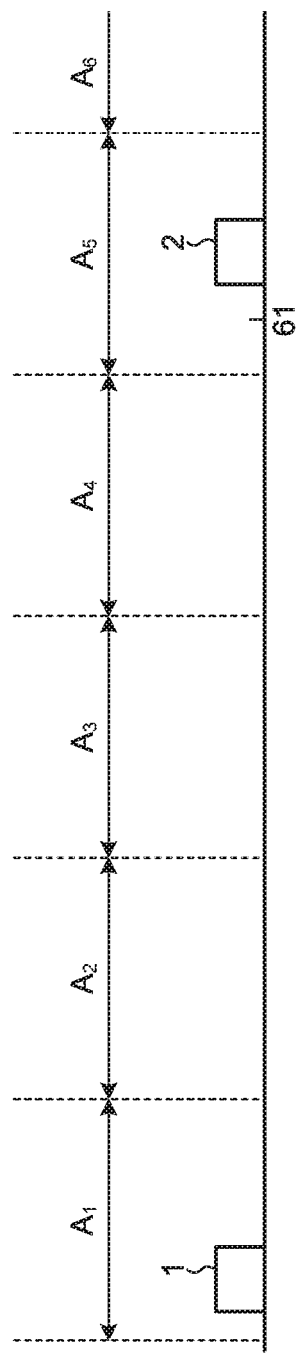
FIG. 2 is a schematic diagram illustrating an example of communication areas along a route to which the train control system according to the first embodiment is applied.

FIG. 2 is a schematic diagram illustrating an example of communication areas along a route to which the train control system according to the first embodiment is applied. In FIG. 2, the train 1 is located in a communication area $A_1$, the communication area $A_1$ is formed adjacent a communication area $A_2$, the communication area $A_2$ is formed adjacent a communication area $A_3$, the communication area $A_3$ is formed adjacent a communication area $A_4$, the communication area $A_4$ is formed adjacent a communication area $A_5$, and the communication area $A_5$ is formed adjacent a communication area $A_6$. The train 2 that is a preceding train closest to the train 1 is located in the communication area $A_5$. The travelling permission point 61 for the train 1 is set at a position that is away from the tail end of the last car of the preceding train 2 by a distance that should be maintained between the train 1 and the train 2, that is, a distance that prevents the train 1 from colliding with the train 2.

In FIG. 2, a ground wireless base station forming the communication area $A_2$, a ground wireless base station forming the communication area $A_3$, a ground wireless base station forming the communication area $A_4$, and a ground wireless base station forming the communication area $A_5$ are set as handover destinations, such that a reservation for allocation of radio resource is made at a position in front of a handover point in each communication area. When the train 1 detects that the train 1 has passed through the handover point, the handover is performed. However, the base station control device 41 does not reserve a radio resource in the communication area $A_6$ existing ahead of the communication area $A_5$ where the travel permission point 61 is located, as viewed from the train 1.

Figure 3:
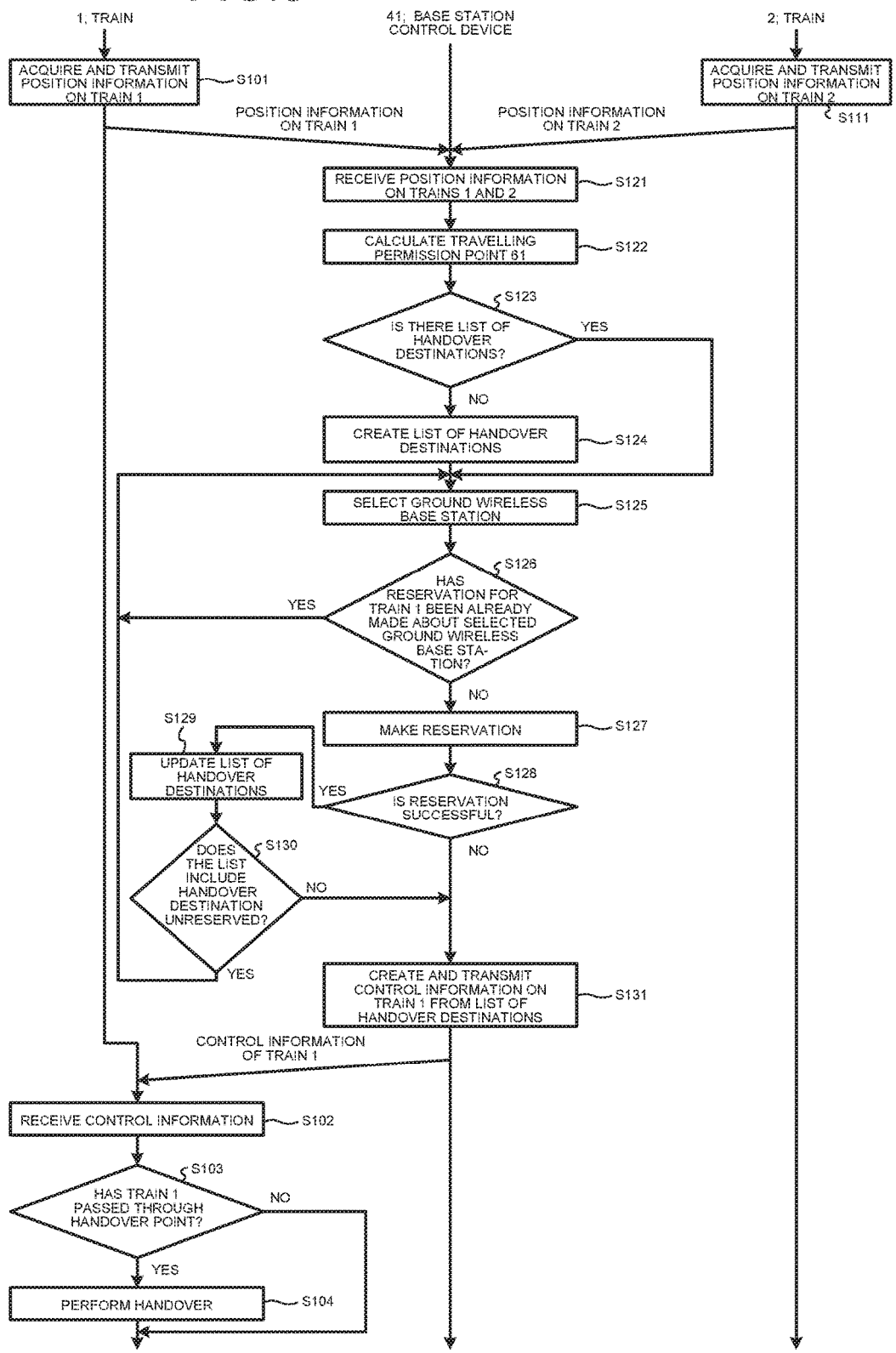
FIG. 3 is a sequence diagram illustrating an example of operations of trains and a base station control device when a reservation for allocation of radio resource in association with handover is made in the train control system according to the first embodiment.

FIG. 3 is a sequence diagram illustrating an example of operations of the trains 1 and 2 and the base station control device 41 when a reservation for allocation of radio resource in association with handover is made in the train control system according to the first embodiment. In FIG. 3, the operation of the train 1 is performed by either of the on-vehicle control device 11 and the on-vehicle wireless station 21 that are mounted on the train 1, and the operation of the train 2 is performed by either of the on-vehicle control device 12 and the on-vehicle wireless station 22 that are mounted on the train 2.

First, the train 1 acquires position information on the train 1 and transmits the position information to the base station control device 41 (S101). The preceding train 2 acquires position information on the train 2 and transmits the position information to the base station control device 41 (S111). The position information on the train 1 and the position information on the preceding train 2 are calculated by using position information on a track antenna or a point (both not illustrated) installed along a railroad and speed information on the trains 1 and 2.

The base station control device 41 receives the transmitted position information on the trains 1 and 2 (S121) and calculates the travelling permission point 61 for the train 1 from the position information on the trains 1 and 2 (S122). The travel permission point 61 for the train 1 is set at a position that is away from the tail end of the last car of the preceding train 2 by a distance that should be maintained between the train 1 and the train 2, as described above. The distance between the trains 1 and 2 is recorded in advance in a memory included in the base station control device 41.

Subsequently, the base station control device 41 determines whether there is a list of handover destinations (S123). When the operation proceeds to "NO" from S123, that is, when there is no list of handover destinations in the base station control device 41, the base station control device 41 creates the list of handover destinations (S124) and selects a ground wireless base station (S125). When the selection of the ground wireless base station is made immediately after creation of the list of handover destinations, the ground wireless base station to be selected is the closest ground wireless base station as a handover destination from the position information on the train 1. The list of handover destinations includes all ground wireless base stations from the closest ground wireless base station as the handover destination of the train 1 to the ground wireless base station of the area including the travelling permission point 61 for the train 1. That is, in FIG. 2, the list of handover destinations is created so as to include all ground wireless base stations from the ground wireless base station forming the communication area $A_2$ that is the closest ground wireless base station as the handover destination of the train 1 to the ground wireless base station forming the communication area $A_5$ including the travelling permission point 61 for the train 1.

When the operation proceeds to "YES" from S123, that is, when the list of handover destinations exists in the base station control device 41, the base station control device 41 selects a ground wireless base station from the existing list of handover destinations without creating a list of handover destinations (S125). When the existing list of handover destinations is used, the ground wireless base station to be selected is the closest ground wireless base station as the handover destination from the position information on the train 1 or a ground wireless base station that becomes a next handover destination of a ground wireless base station updated at S129 described later. In other words, the closest ground wireless base station to the train 1 is selected from among the ground wireless base stations that are handover destinations having radio resources unreserved. Also, the closest ground wireless base station as the handover destination can be defined as a ground wireless base station that is located on a side of the train in a travelling direction of the train 1 and, and is closest to the train 1 except for the ground wireless base station with which the train 1 is communicating. As an example, in FIG. 1, the closest ground wireless base station as the handover destination of the train 1 is the ground wireless base station 32 that is the closest one of the ground wireless base stations 31, 32, and 33 located on the side of the train 1 in the travelling direction of the train 1, except for the ground wireless base station 31 with which the train 1 is communicating.

Subsequently, the base station control device 41 determines whether a reservation for allocation of radio resource to the train 1 has been already made in the selected ground wireless base station (S126). When the operation proceeds to "NO" from S126, that is, when the allocation of radio resource has not been reserved in the selected ground wireless base station, the base station control device 41 makes the reservation (S127) and determines whether the reservation is successful (S128).

In the reservation for the allocation of radio resource, a train ID that is identification information on the train 1 is transmitted from the base station control device 41 to a ground wireless base station that is a next handover destination. In response, information indicating whether the reservation for the allocation of radio resource is successful is transmitted from the ground wireless base station to the base station control device 41, and, when the reservation is successful, information specifying an allocated radio resource is further transmitted from the ground wireless base station to the base station control device 41. In a case where the radio resource is divided into slots, the information specifying the radio resource can exemplifies a slot number. Shortage of the radio source in the ground wireless base station can be considered as a cause of an unsuccessful reservation for allocation.

When the operation proceeds to "YES" from S128, that is, when the reservation is successful, the list of handover destinations is updated (S129), and it is determined whether the list of handover destinations includes a handover destination having the radio resource unreserved (S130). When the operation proceeds to "YES" from S130, that is, when there is the handover destination having the radio resource unreserved, the operation returns to S125. When the operation proceeds to "YES" from S126, the operation returns to S125 without updating the list of handover destinations because the reservation is not made.

When the operation proceeds to "NO" from S128 or "NO" from S130, control information on the train 1 is created from the list of handover destinations and is transmitted to the train 1 (S131). The control information on the train 1 includes information specifying the radio resources of all of the ground wireless base stations in which the allocations of these radio resources are reserved, position information on handover points at which the train 1 performs handover to all of the ground wireless base stations in which the allocations are reserved, and position information on the travelling permission information 61. Positions of the handover points are fixed and are determined by positions of the ground wireless base stations. The position information on the handover points is recorded in advance in the memory included in the base station control device 41.

Upon receiving the control information transmitted from the base station control device 41 (S102), the train 1 compares the position information on the train 1 with a handover point at which the train 1 performs handover to the closest ground wireless base station as the handover destination, to determine whether the train 1 has passed through the handover point (S103). When the operation proceeds to "YES" from S103, that is, when the train 1 has passed through the handover point, the train 1 performs handover (S104). When the operation proceeds to "NO" from S103, the train 1 determines that the train 1 has not passed through the handover point, and does not perform handover.

A series of operations illustrated in FIG. 3 described above is periodically repeated. Therefore, after handover is performed at S104, the position information on the train 1 is transmitted again from the train 1 to the base station control device 41 via a post-handover ground wireless base station, so that the position information on the train 1 is updated. It is assumed here that information to be transmitted to the base station control device 41 includes information on the transmission source. The base station control device 41 refers to the transmission-source information in the received position information, detects completion of handover because the transmission-source information indicates the post-handover ground wireless base station. Then, the base station control device 41 transmits to a pre-handover ground wireless base station an instruction to release a radio resource having been used by the train 1. Releasing the radio resource after handover in this manner achieves effective use of limited radio resources.

As described above, the list of handover destinations is created when there is no list of handover destinations, and the existing list of handover destinations is used when the list of handover destinations exists. As a result, it is possible to reserve the allocations of the radio resources to the train 1 for all of the ground wireless base stations from the closest ground wireless base station to the train 1 as the handover destination to the ground wireless base station of the communication area including the travel permission point 61 for the train 1. Further, the reservation for allocation of the radio resource of the ground wireless base station of the communication area ahead of the communication area including the travel permission point 61 for the train 1 is not made while the resource of the ground wireless base station, which has been used before the performance of handover, is released after the performance of handover. Therefore, the limited radio resources can be effectively used.

As described above, in the first embodiment, the ground wireless base station 32 that is a third ground wireless base station is located between the ground wireless base station 31 that is a first ground wireless base station with which the on-vehicle wireless station 21 is communicating and the ground wireless base station 33 that is a second ground wireless base station forming a communication area including the travel permission point 61 determined by a position of the train 2. The base station control device 41 reserves the radio resources of the ground wireless base stations 32 and 33 while the base station control device 41 communicates with the ground wireless base station 31. The single ground wireless base station 32 that is the third ground wireless base station can be provided as illustrated in FIG. 1, or the plural ground wireless base stations can be provided as illustrated in FIG. 2. This configuration makes it possible to reserve the allocations of the radio resources of all of the ground wireless base stations located between a current position of a train and a travelling permission position. Therefore, a problem of failure to increase a speed due to a reservation being made for only a next handover destination can be avoided. Accordingly, even in a case where there is a communication area formed by some ground wireless base station between the communication area of the ground wireless base station with which the on-vehicle wireless station is communicating and the communication area including the travelling permission position determined by a relation with a preceding train, it is possible to obtain a train control system that enables a train to smoothly travel while performing handover. Because the train can smoothly travel, the energy efficiency of the train is favorable and the amount of energy consumption can be reduced. Further, in a case where plural ground wireless base stations are included between the communication area of the ground wireless base station that is currently preforming communication and the communication area including the travelling permission point 61 for the train 1, it is possible to reserve the radio resources in order from the closest ground wireless base station to the train 1 to the ground wireless base station of the communication area including the travelling permission point 61 for the train 1.

Second Embodiment

A description is made as to a second embodiment in which a data amount of control information transmitted from a base station control device to a train can be made less than that in the train control system according to the first embodiment.

In the train control system according to the first embodiment, the control information transmitted from the base station control device 41 to the train 1 at S131 includes information specifying radio resources of all of ground wireless base stations in which the allocations of these radio resources are reserved, position information on handover points at which to perform handovers to all of the ground wireless base stations in which the allocations are reserved, and position information on the travel permission point 61. In a train control system according to the second embodiment, the control information transmitted from the base station control device 41 to the train 1 at S131 includes information specifying a radio resource of a next handover destination in which the allocation of this radio resource is reserved, position information on a handover point at which the train 1 performs handover to the next handover destination in which the allocation is reserved, and position information on the travelling permission point 61.

The description is made with reference to FIG. 1 as an example. The control information transmitted from the base station control device 41 to the train 1 in the first embodiment includes information specifying a radio resource of the ground wireless base station 32 in which the allocation of this radio resource is reserved, information specifying a radio resource of the ground wireless base station 33, position information on the handover point 51 at which the train 1 performs handover to the ground wireless base station 32 in which the allocation is reserved, position information on the handover point 52 at which the train 1 performs handover to the ground wireless base station 33 in which the allocation is reserved, and position information on the travel permission point 61. Meanwhile, the control information transmitted from the base station control device 41 to the train 1 in the second embodiment includes information specifying the radio resource of the ground wireless base station 32 in which the allocation of the radio resource is reserved, position information on the handover point 51 at which the train 1 performs handover to the ground wireless base station 32 in which the allocation is reserved, and the position information on the travel permission point 61. That is, the control information transmitted from the base station control device 41 to the train 1 in the second embodiment does not include the information specifying the radio resource of the ground wireless base station 33 and the position information on the handover point 52 at which the train 1 performs handover to the ground wireless base station 33 in which the allocation is reserved. Therefore, the data amount can be reduced by the amount of two pieces of information.

As described above, even when the control information transmitted from the base station control device 41 to the train 1 does not include the information specifying the radio resource of the ground wireless base station 33 and the position information on the handover point 52 at which the train 1 performs handover to the ground wireless base station 33 in which the allocation is reserved, the series of operations illustrated in FIG. 3 described above is periodically repeated. Therefore, the information specifying the radio resource of the ground wireless base station 33 and the position information on the handover point 52 at which the train 1 performs handover to the ground wireless base station 33 in which the allocation is reserved are acquired during the communication with the ground wireless base station 32, thereby reducing the amount of data transmitted and received as well as achieving the same advantageous effects as those in the first embodiment. Because the radio resource has been already reserved also in the second embodiment, wireless communication with a handover destination can be immediately started when the base station control device 41 transmits information on the reserved radio resource and position information on a handover point.

As described above, according to the second embodiment, it is possible to reduce the data amount of control information transmitted from the base station control device to the train.

In the first and second embodiments described above, the operation performed by the base station control device 41 can be performed in the ground wireless base stations 31, 32, and 33. In this case, the base station control device 41 is not essential.

Although the trains 1 and 2 have the on-vehicle wireless stations 21 and 22 mounted thereon, respectively, in the first and second embodiments described above, the present invention is not limited thereto, and a plurality of on-vehicle wireless stations can be provided in one train.

Although in the first and second embodiments described above the wired communication is performed between the ground wireless base stations 31, 32, and 33 and the base station control device 41, the present invention is not limited thereto and a configuration can be employed in which wireless communication is performed between the ground wireless base stations 31, 32, and 33 and the base station control device 41.

Although the number of the ground wireless base stations is three or five and the number of the base station control device is one in the first and second embodiments described above, the present invention is not limited thereto. The number of the ground wireless base stations and the number of the base station control devices are not limited provided that a plurality of ground wireless base stations are provided in such a manner as to cover the area along a railroad.

Although in the first and second embodiments described above, the handover point is described as being represented by the distance in kilometers in each railroad section and recorded in the base station control device, the present invention is not limited thereto, and the handover point can be recorded as a coordinate on a map including the railroad.

Although, in the first and second embodiments described above, the handover point is the intermediate point between the two ground wireless base stations with which the on-vehicle wireless station communicates before and after handover, the present invention is not limited thereto. The handover point may be set taking account of the positions of installation of the ground wireless base stations or the communication environment to prevent interruption of the communication between the on-vehicle wireless station and the ground wireless base stations within the areas along the railroad.

Although, in the first and second embodiments described above, the position information on the trains 1 and 2 is calculated by using the position information on the track antenna or the point installed along the railroad and the speed information on the trains 1 and 2, the present invention is not limited thereto, and a GPS (Global Positioning System) can be used.

Although the train control systems are described in the first and second embodiments described above, the present invention is not limited thereto. The base station control device, the ground wireless base station, and the on-vehicle wireless station described in the first and second embodiments are also included in the present invention.

Figure 4:
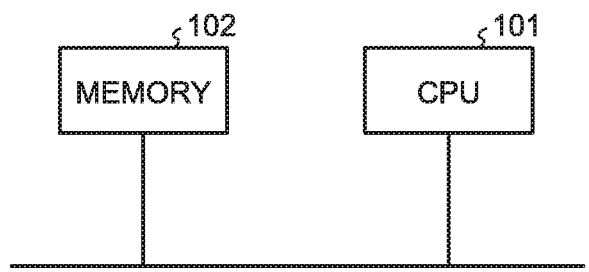
FIG. 4 is a diagram illustrating a general configuration of hardware realizing respective devices mounted on train control systems according to the first embodiment and a second embodiment.

In the first and second embodiments described above, the on-vehicle control devices 11 and 12, the on-vehicle wireless stations 21 and 22, the ground wireless base stations 31, 32, and 33, and the base station control device 41 include at least a CPU (Central Processing Unit) and a memory and the operations of the respective devices can be realized by software. FIG. 4 is a diagram illustrating a general configuration of hardware realizing the respective devices. The device illustrated in FIG. 4 includes the CPU 101 and the memory 102. The CPU 101 uses input data to perform the calculation and control by software, and the memory 102 stores therein input data and data necessary for the CPU 101 to perform the calculation and control. The CPU 101 and the memory 102 can be respectively provided in plural.

The configurations described in the first and second embodiments are only examples of the contents of the present invention. The configurations can be combined with other well-known techniques, and a part the configurations can be omitted or modified without departing from the scope of the present invention.

REFERENCE SIGNS LIST

1, 2 train
11, 12 on-vehicle control device
21, 22 on-vehicle wireless station
31, 32, 33 ground wireless base station
41 base station control device
51, 52 handover point
61 travelling permission point
101 CPU
102 memory
201, 202, 301, 302, 303 antenna

The invention claimed is:

1. A train control system comprising:
an on-vehicle wireless station mounted on a following train following a preceding train and connected to an on-vehicle control device of the following train;
a plurality of ground wireless base stations configured to wirelessly communicate with the on-vehicle wireless station; and
a base station control device to control the ground wireless base stations, wherein
one or a plurality of third ground wireless base stations are located between a first ground wireless base station that is the ground wireless base station with which the on-vehicle wireless station is communicating and a second ground wireless base station forming a communication area including a travelling permission point determined by a position of the preceding train for permitting the following train to travel to the travelling permission point, and
the base station control device includes:
a processor to execute a program; and
a memory to store the program which, when executed by the processor, performs a process of reserving radio resources of the second ground wireless base station and the third ground wireless base station while communicating with the first ground wireless base station.

2. The train control system according to claim 1, wherein the radio resources are reserved in order from a closest ground wireless base station to the following train among the third ground wireless base stations to the second ground wireless base station.

3. The train control system according to claim 1, wherein the program, when executed by the processor, performs a process of transmitting information specifying the reserved radio resources of the second ground wireless base station and the third ground wireless base station, handover points of the second ground wireless base station and the third ground wireless base station, and the travelling permission point to the on-vehicle wireless station of the following train.

4. The train control system according to claim 1, wherein the program, when executed by the processor, performs a process of transmitting information specifying the reserved radio resource of one of the third ground wireless base stations that becomes a next handover destination of the first ground wireless base station, a handover point located between the first ground wireless base station and the one of the third ground wireless base stations that becomes the next handover destination of the first ground wireless base station, and the travelling permission point to the on-vehicle wireless station of the following train.

5. A base station control device for a train control system having a plurality of ground wireless base stations configured to wirelessly communicate with an on-vehicle wireless station, including at least one third ground wireless base station located between a first ground wireless base station, which communicates with an on-vehicle wireless station mounted on a following train following a preceding train and connected to an on-vehicle control device of the following train, and a second ground wireless base station forming a communication area including a travelling permission point determined by a position of the preceding train for permitting the following train to travel to the travelling permission point, said base station control device comprising:
a processor to execute a program; and
a memory to store the program which, when executed by the processor, performs a process of reserving radio resources of the second ground wireless base station and the third ground wireless base station while communicating with the first ground wireless base station.

6. The base station control device according to claim 5, wherein the radio resources are reserved in order from a closest ground wireless base station to the following train among the third ground wireless base stations to the second ground wireless base station.

7. The base station control device according to claim 5, wherein the program, when executed by the processor, performs a process of transmitting information specifying the reserved radio resources of the second ground wireless base station and the third ground wireless base station, handover points of the second ground wireless base station and the third ground wireless base station, and the travelling permission point to the on-vehicle wireless station of the following train.

8. The base station control device according to claim 5, wherein the program, when executed by the processor, performs a process of transmitting information specifying the reserved radio resource of one of the third ground wireless base stations that becomes a next handover destination of the first ground wireless base station, a handover point located between the first ground wireless base station and the one of the third ground wireless base stations that becomes the next handover destination of the first ground wireless base station, and the travelling permission point to the on-vehicle wireless station of the following train.

9. A base station control device in combination with a ground wireless base station system controlled by the base station control device, the ground wireless base station system comprising:

a first ground wireless base station in communication with an on-vehicle wireless station mounted on a train following a preceding train;

a second ground wireless base station forming a communication area including a travelling permission point determined by a position of the preceding train for permitting the following train to travel to the travelling permission point;

a plurality of third ground wireless base stations located between the first and second ground wireless base stations;

the second and third ground wireless base stations being configured to communicate with the on-vehicle wireless station;

the first, second and third ground wireless base stations having radio resources for allocation to the following train; and while the first ground wireless base station is in communication with the base station control device, the allocation of each of the radio resources of the second and third ground wireless base stations is reserved by the base station control device.

* * * * *